United States Patent [19]

Sandbrand

[11] Patent Number: 5,065,151

[45] Date of Patent: Nov. 12, 1991

[54] VIDEO SWITCH EXCHANGE WITH BLACKOUT TIME CONTROL

[75] Inventor: Alexander Sandbrand, Yonkers, N.Y.

[73] Assignee: Technical Telephone Systems, Inc., Staten Island, N.Y.

[21] Appl. No.: 264,451

[22] Filed: Oct. 28, 1988

[51] Int. Cl.[5] .............................................. H04Q 3/545
[52] U.S. Cl. ........................... 340/825.22; 340/309.15;
340/825.27; 358/220
[58] Field of Search ........... 340/309.15, 309.6, 825.03,
340/825.22, 825.26, 825.27, 825.79, 825.83, 717;
364/143, 144, 145; 358/181, 185, 220, 86;
379/53, 54, 242

[56] References Cited

U.S. PATENT DOCUMENTS

| | | | |
|---|---|---|---|
| 4,228,543 | 10/1980 | Jackson | 340/309.15 |
| 4,338,623 | 7/1982 | Asmus et al. | 358/220 |
| 4,851,708 | 7/1989 | Palmer | 340/825.22 |
| 4,887,260 | 12/1989 | Carden et al. | 340/825.17 |

OTHER PUBLICATIONS

Curnal et al., "Automated Television Operating Centers", Bell Laboratories Record, Mar. 1978, pp. 65-70.
Watanabe et al., "Television Network Supervisory and Control System", NEC Res. & Dev., No. 55, Oct. 1979, pp. 1-9.
Sakamoto et al., "Model AO-3A Video Switching Equipment of Television Network", NEC Res & Dev., No. 62, Jul. 1981, pp. 49-56.

*Primary Examiner*—Donald J. Yusko
*Assistant Examiner*—Edwin C. Holloway, III
*Attorney, Agent, or Firm*—Fred A. Keire; Eugene L. Flanagan, III

[57] ABSTRACT

An apparatus and method for switching video signals from input lines to output lines. A control device selectively sets a blackout start time and a blackout stop time. A first comparator compares the blackout start time with actual time and a second comparator compares the blackout stop time with actual time. A switch is provided for connecting the input lines to output lines and for disconnecting the input lines from the output lines. The switch is responsive to the first comparator to disconnect all input lines from all output lines when the actual time equals the blackout start time. The switch is also responsive to the second comparator to reconnect the input lines to the output lines when the actual time equals the blackout stop time.

7 Claims, 22 Drawing Sheets

```
                           CHANNEL
         0  1  2  3  4  5  6  7  8  9 10 11 12 13 14 15
USERS  0  □  +  +  +  +  +  +  +  +  +  +  +  +  +  +  +
USERS  1  +  +  +  +  +  +  +  +  +  +  +  +  +  +  +  +
USERS  2  +  +  +  +  +  +  +  +  +  +  +  +  +  +  +  +
USERS  3  +  +  +  +  +  +  +  +  +  +  +  +  +  +  +  +
USERS  4  +  +  +  +  +  +  +  +  +  +  +  +  +  +  +  +
USERS  5  +  +  +  +  +  +  +  +  +  +  +  +  +  +  +  +
USERS  6  +  +  +  +  +  +  +  +  +  +  +  +  +  +  +  +
USERS  7  +  +  +  +  +  +  +  +  +  +  +  +  +  +  +  +
USERS  8  +  +  +  +  +  +  +  +  +  +  +  +  +  +  +  +
USERS  9  +  +  +  +  +  +  +  +  +  +  +  +  +  +  +  +
USERS 10  +  +  +  +  +  +  +  +  +  +  +  +  +  +  +  +
USERS 11  +  +  +  +  +  +  +  +  +  +  +  +  +  +  +  +
USERS 12  +  +  +  +  +  +  +  +  +  +  +  +  +  +  +  +
USERS 13  +  +  +  +  +  +  +  +  +  +  +  +  +  +  +  +
USERS 14  +  +  +  +  +  +  +  +  +  +  +  +  +  +  +  +
USERS 15  +  +  +  +  +  +  +  +  +  +  +  +  +  +  +  +

CURSOR UP = 8, DWN. = 2, LFT = 4, RGT = 6, QUIT = 0.
```

FIG.1B

FORCE A CHANNEL TO ALL USERS.

1). SELECT CH.
2). ACTIVATE.
3). DISABLE.
4). STATUS.
5). QUIT.

SELECT ONE AS 1,2,..... ☐

FIG. 2B

MULTIPLE CRT TURRET ASSIGNMENTS

| T | US | US | US | T | US | US | US | T | US | US | US | T | US | US | US |
|---|----|----|----|---|----|----|----|---|----|----|----|---|----|----|----|
| 0 | □ | 1 | 2 | 3 | 16 | – | – | – | 32 | – | – | – | 48 | – | – | – |
| 1 | 4 | 5 | 6 | 7 | 17 | – | – | – | 33 | – | – | – | 49 | – | – | – |
| 2 | 8 | 9 | 10 | 11 | 18 | – | – | – | 34 | – | – | – | 50 | – | – | – |
| 3 | 12 | 13 | 14 | 15 | 19 | – | – | – | 35 | – | – | – | 51 | – | – | – |
| 4 | 16 | 17 | 18 | 19 | 20 | – | – | – | 36 | – | – | – | 52 | – | – | – |
| 5 | 20 | 21 | 22 | 23 | 21 | – | – | – | 37 | – | – | – | 53 | – | – | – |
| 6 | 24 | 25 | 26 | 27 | 22 | – | – | – | 38 | – | – | – | 54 | – | – | – |
| 7 | 28 | 29 | 30 | 31 | 23 | – | – | – | 39 | – | – | – | 55 | – | – | – |
| 8 | 32 | 33 | 34 | 35 | 24 | – | – | – | 40 | – | – | – | 56 | – | – | – |
| 9 | 36 | 37 | 38 | 39 | 25 | – | – | – | 41 | – | – | – | 57 | – | – | – |
| 10 | 40 | 41 | 42 | 43 | 26 | – | – | – | 42 | – | – | – | 58 | – | – | – |
| 11 | 44 | 45 | 46 | 47 | 27 | – | – | – | 43 | – | – | – | 59 | – | – | – |
| 12 | 48 | 49 | 50 | 51 | 28 | – | – | – | 44 | – | – | – | 60 | – | – | – |
| 13 | 52 | 53 | 54 | 55 | 29 | – | – | – | 45 | – | – | – | 61 | – | – | – |
| 14 | 56 | 57 | 58 | 59 | 30 | – | – | – | 46 | – | – | – | 62 | – | – | – |
| 15 | 60 | 61 | 62 | 63 | 31 | – | – | – | 47 | – | – | – | 63 | – | – | – |

CURSOR UP = 8, DWN. = 2, LFT = 4, RGT = 6. QUIT = 0.
TURRET = 0, CRT = 5

FIG. 3C

GROUP 00 HAS 00 AS LEADER.
GROUP 01 HAS NO LEADER.
GROUP 02 HAS NO LEADER.
GROUP 03 HAS NO LEADER.
GROUP 04 HAS NO LEADER.
GROUP 05 HAS NO LEADER.
GROUP 06 HAS NO LEADER.
GROUP 07 HAS NO LEADER.
GROUP 08 HAS NO LEADER.
GROUP 09 HAS NO LEADER.
GROUP 10 HAS NO LEADER.
GROUP 11 HAS NO LEADER.
GROUP 12 HAS NO LEADER.
GROUP 13 HAS NO LEADER.
GROUP 14 HAS NO LEADER.
GROUP 15 HAS NO LEADER.
GROUP 16 HAS NO LEADER.
GROUP 17 HAS NO LEADER.
GROUP 18 HAS NO LEADER.
GROUP 19 HAS NO LEADER.
GROUP 20 HAS NO LEADER.
GROUP 21 HAS NO LEADER.
GROUP 22 HAS NO LEADER.
GROUP 23 HAS NO LEADER.
GROUP 24 HAS NO LEADER.
GROUP 25 HAS NO LEADER.
GROUP 26 HAS NO LEADER.
GROUP 27 HAS NO LEADER.
GROUP 28 HAS NO LEADER.
GROUP 29 HAS NO LEADER.
GROUP 30 HAS NO LEADER.
GROUP 31 HAS NO LEADER.

HIT ESCAPE KEY TO RESTART.

FIG. 4C

```
                              GROUPS
GROUP   LEADER   S0   S1   S2   S3   S4   S5   S6   S7   S8   S9
  0       □     -    -    -    -    -    -    -    -    -    -
  1       -     -    -    -    -    -    -    -    -    -    -
  2       -     -    -    -    -    -    -    -    -    -    -
  3       -     -    -    -    -    -    -    -    -    -    -
  4       -     -    -    -    -    -    -    -    -    -    -
  5       -     -    -    -    -    -    -    -    -    -    -
  6       -     -    -    -    -    -    -    -    -    -    -
  7       -     -    -    -    -    -    -    -    -    -    -
  8       -     -    -    -    -    -    -    -    -    -    -
  9       -     -    -    -    -    -    -    -    -    -    -
 10       -     -    -    -    -    -    -    -    -    -    -
 12       -     -    -    -    -    -    -    -    -    -    -
 13       -     -    -    -    -    -    -    -    -    -    -
 14       -     -    -    -    -    -    -    -    -    -    -
 15       -     -    -    -    -    -    -    -    -    -    -
```

CURSOR UP = 8, DWN. = 2, LFT = 4, RGT = 6, QUIT = 0, CHANGE = C

FIG.4D

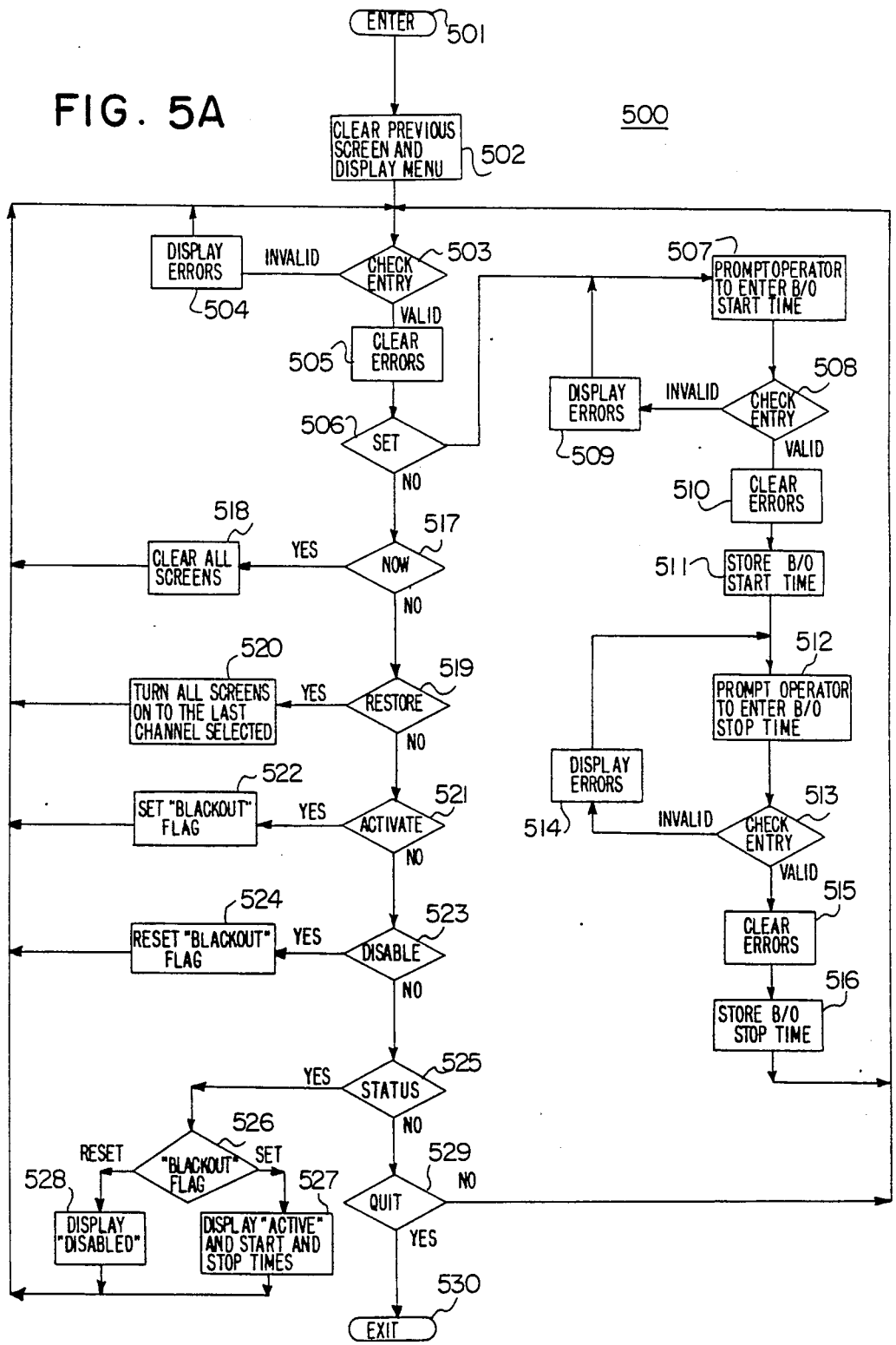

```
            BLACKOUT

1). SET.
         2). NOW.
         3). RESTORE.
         4). ACTIVATE.
         5). DISABLE.
         6). STATUS.
         7). QUIT.

ACTIVE
    FROM 17:0:0  to 5:0:0
       TIME IS NOW  12:25:33
    SELECT ONE AS 1,2,...0
```

FIG. 5B

MONITOR

| US CH | US CH | US CH | US CH |
|---|---|---|---|
| 00 | 16 | 32 | 48 |
| 01 | 17 | 33 | 49 |
| 02 | 18 | 34 | 50 |
| 03 | 19 | 35 | 51 |
| 04 | 20 | 36 | 52 |
| 05 | 21 | 37 | 53 |
| 06 | 22 | 38 | 54 |
| 07 | 23 | 39 | 55 |
| 08 | 24 | 40 | 56 |
| 09 | 25 | 41 | 57 |
| 10 | 26 | 42 | 58 |
| 11 | 27 | 43 | 59 |
| 12 | 28 | 44 | 60 |
| 13 | 29 | 45 | 61 |
| 14 | 30 | 46 | 62 |
| 15 | 31 | 47 | 63 |

HIT ESCAPE TO EXIT MONITOR.▫

1): ACTIVATE.
2): DISABLE.
3): STATUS.
4): QUIT.

M.I.S. DISABLED.
SELECT ONE AS 1,2,... 0
```

FIG. 8B

```
1). VIDEO SCAN.
2). TIME.
3). DATE.
4). SET TIME.
5). SET DATE.
6). FORCE A CHANNELL.
7). SET DEFAULTS.
8). GROUP SET UP.
9). BLACK OUT.
A). MONITOR.
B). PASS WORD.
C). M.I.S.
D). BYE
```

ENTER YOUR SELECTION AS 1,2,3... ☐

FIG. 13

VIDEO SWITCH EXCHANGE WITH BLACKOUT TIME CONTROL

FIELD OF THE INVENTION

The present invention is directed generally to computerized trading systems and more particularly is directed to a computerized trading system which supplies video input signals to video screens at different work stations under console control.

BACKGROUND OF THE INVENTION

With the rapid growth of information sources now available to financial analysts and traders who must apply this information to a high volume of trades each day, it has become important to provide each trader with powerful computational facilities which can rapidly perform analysis, illustrate trending and provide decision information as required for profitable trading. The communications intensive needs for financial trading businesses continue to grow, as more and more different sources of information must be accessed for the trader to make an informed decision in his business activities.

However, merely multiplying the number of conventional computer-provided sources without providing the necessary communications between each trader out of a large group of traders and each source out of a large group of sources is highly impractical. Such multiplication of known systems requires a high installation expense and is cable intensive. It is also disadvantageous to depend upon large host computers, which are very expensive both to install and to operate.

OBJECTS AND SUMMARY OF THE INVENTION

Accordingly, it is an object of the present invention to provide apparatus within a computerized trading system which avoids the above-described difficulties of the prior art.

It is another object of the present invention to provide a computerized trading system which emphasizes user interaction and user friendliness with each of a large number of work stations.

It is yet another object of the present invention to provide a computerized trading system which provides for the selected display of information received from any of a number of wire services or from within the trading group.

It is a further object of the present invention to provide a computerized trading system which permits initial implementation of a few trader stations, yet permits the system to grow and expand as additional services, facilities or stations are required.

It is yet a further object of the present invention to provide a computerized trading system which is not cable intensive and uses distributed processing and modular architecture to avoid dependence upon large host computers.

In accordance with one aspect of the present invention, a video scan operation is provided by an apparatus for switching video signals from one of a plurality of input lines to one of a plurality of output lines. The apparatus comprises console display means for displaying a chart showing connections between the input lines and the output lines and for displaying a cursor, cursor control means for selectively positioning the cursor in the chart and switching means, responsive to the cursor control means, for connecting a selected one of the input lines to a selected one of the output lines.

In accordance with another aspect of the present invention, a channel forcing operation is provided by an apparatus for switching video signals from one of a plurality of input lines to a plurality of output lines. The apparatus comprises means for selecting a particular input line, means for disconnecting all input lines from all output lines, and means for connecting the particular input line to all output lines.

In accordance with another aspect of the present invention, a set system configuration operation is provided by an apparatus for switching video signals from input lines to output lines, the output lines being connected to video monitors and a plurality of video monitors being associated with each of a plurality of remote control stations. The apparatus comprises console display means for displaying a chart showing assignments of the video monitors to the remote control stations and for displaying a cursor, cursor control means for selectively positioning the cursor in the chart, control means for selectively assigning a particular video monitor to a particular control station, wherein the control means is responsive to the cursor control means when selecting the particular video monitor and the particular control station, and switching means, responsive to the control means, for switching input lines to output lines, thereby connecting input lines to video monitors.

In a further aspect of the present invention, a set groups operation is provided by apparatus for switching video signals from input lines to output lines, the output lines being connected to video monitors, the video monitors being associated with remote control stations, and the remote control stations being arranged in groups, each group having a leader station and at least one slave station. The apparatus comprises console display means for displaying a chart showing assignments of leaders and members to groups and for displaying a cursor, cursor control means for selectively positioning the cursor in the chart, control means for selectively assigning a first remote control station as a leader station for a given group and for selectively assigning a second remote control station as a slave station for the given group, wherein the control means is responsive to the cursor control means when assigning the remote control stations, and switching means, responsive to the control means, for switching input lines to output lines.

In accordance with another aspect of the present invention, a blackout operation is achieved by an apparatus for switching video signals from input lines to output lines, the apparatus comprising control means for selectively setting a blackout start time and for selectively setting a blackout stop time, first comparing means for comparing the blackout start time with actual time, second comparing means for comparing the blackout stop time with actual time, and switching means for connecting the input lines to the output lines and for disconnecting the input lines from the output lines, the switching means being responsive to the comparing means to disconnect all input lines from all output lines when the actual time equals the blackout start time, the switching means being responsive to the second comparing means to reconnect the input lines to the output lines when the actual time equals the blackout stop time.

In accordance with another aspect of the present invention, a monitor operation is provided by an apparatus for switching video signals from input lines to output lines, the output lines being connected to video monitors, the video monitors being associated with remote control stations. The apparatus comprises switching means, responsive to the remote control stations, for connecting selected input lines to selected output lines, means, responsive to the switching means, for determining which input lines are connected to which output lines and console display means, responsive to the means for determining, for displaying a chart showing the connections between the input lines and the output lines and for showing changes in the connections.

In accordance with another aspect of the present invention, a management information system operation is provided by an apparatus for switching video signals from input lines to output lines, the output lines being connected to video monitors, and the video monitors being associated with remote control stations. The apparatus comprises switching means, responsive to the remote control stations, for connecting selected input lines to selected output lines, sensing means, responsive to said switching means, for sensing changes in connections between the input lines and the output lines, memory means, responsive to the sensing means, for storing and recalling information representative of the changes in the connections between the input lines and the output lines, and display means, responsive to the memory means, for selectively producing a chart showing the information representative of the changes in the connections.

These and other objects, aspects and features of the present invention will become apparent from the following detailed description of a preferred embodiment thereof taken in connection with the accompanying drawings, throughout which like reference numerals denote like elements and parts.

BRIEF DESCRIPTION OF THE DRAWINGS

FIG. 1B is a schematic illustration of a computer screen produced by the video scan operation of FIG. 1A;

FIG. 2B is a schematic illustration of a computer screen produced by the forced channel operation of FIG. 2A;

FIG. 3C is a schematic illustration of a computer screen produced by the set system configuration operation of FIGS. 3A and 3B;

FIG. 4C is a schematic illustration of a first computer screen produced by the set groups operation of FIGS. 4A and 4B;

FIG. 4D is a schematic illustration of a second computer screen produced by the set groups operation of FIGS. 4A and 4B;

FIG. 5A is a flow chart of a blackout operation in accordance with the present invention;

FIG. 5B is a schematic illustration of a computer screen produced by the blackout operation of FIG. 5A;

FIG. 7B is a schematic illustration of a computer screen produced by the monitor operation of FIG. 7A;

FIG. 8B is a schematic illustration of a computer screen produced by the management information system operation of FIG. 8A;

FIG. 13 is a schematic illustration of a main menu computer screen produced in accordance with the present invention.

DETAILED DESCRIPTION OF THE PREFERRED EMBODIMENT

Figure 1A:
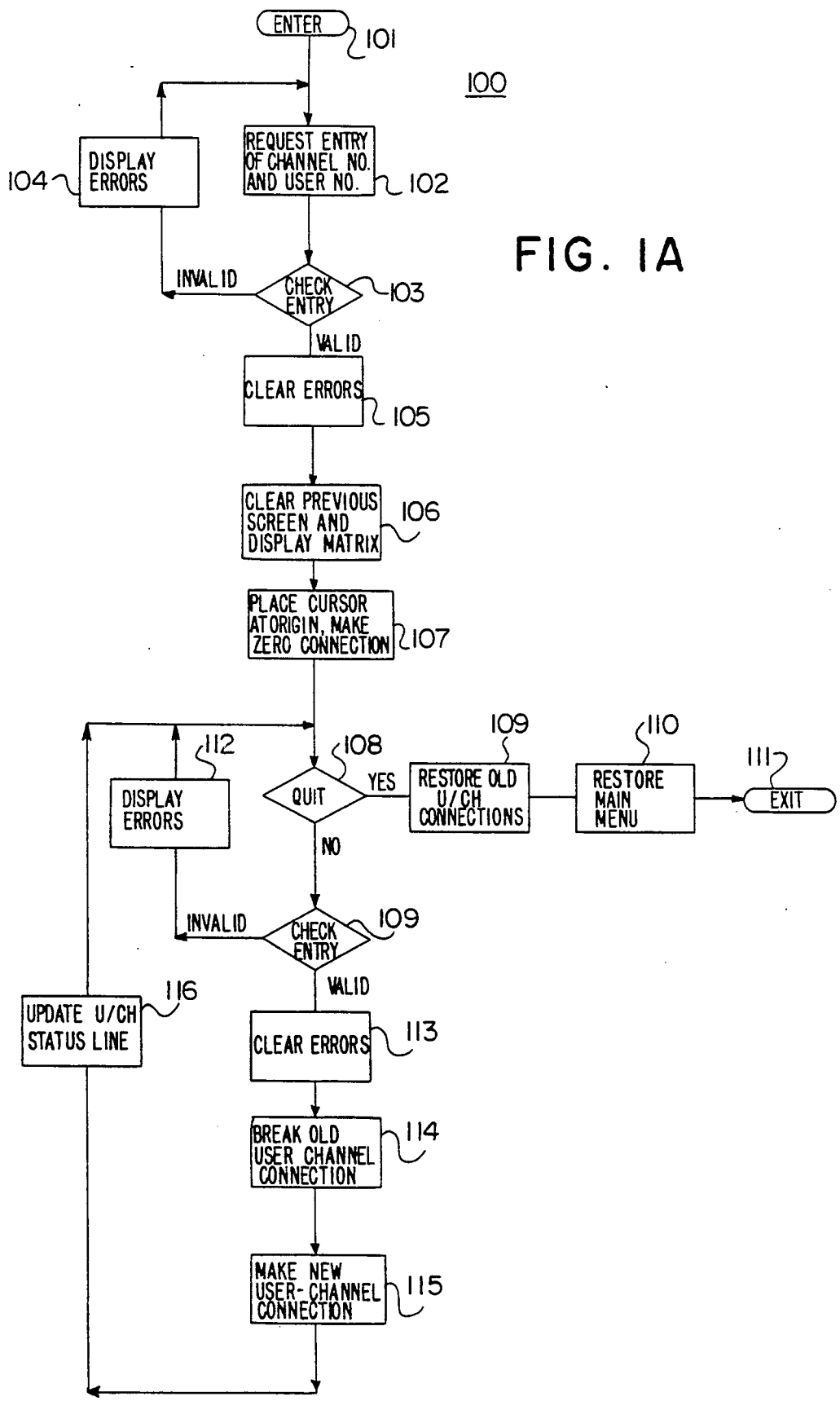
FIG. 1A is a flow chart of a video scan operation in accordance with the present invention.

Referring now to the drawings and initially FIGS. 1A–8B thereof, it will be seen that the present invention provides a number of advantageous operations within a computerized trading system which enable the individual traders at individual work stations as well as a control operator at a centralized control console to receive and process a large amount of information from a number of different video sources. The underlying system is comprised of a number of trader work stations which communicate with centralized equipment and information services through a modular video switching system employing a number of advantageous cross switch matrices. The work stations may be associated in clusters or groups, and all communications between the switching system and the work station groups occur over a single cable, advantageously a fiber optic cable, which loops from the switching system to each work station and back to the switching system. Additional matrices may be added to the system as required. All matrices are interconnected and are configured to share common communication channels with the centralized equipment.

Centralized equipment consists of communications modems, dedicated computers and interface equipment which provide access to both broadcast and interactive wire services. The centralized equipment further includes local equipment such as printers, storage facilities and dedicated computers which are used to monitor trading activity, perform services such as electronic mail and to provide the connection to external host computers, other non-trading work stations and communication networks. It further includes the central telephone equipment, intercom equipment and foreign exchange voice channels.

In accordance with the present invention, the information displays which are supplied in video form are distributed via the switching system which permits each trader to view any of the supplied video channels. Although such switching systems are known in telephone network switching systems, the use of video signals at video signal frequencies in a switching system in accordance with the present invention requires adaptation of the switching system structure. In accordance with the present invention, an advantageous video buffer board is provided in an input module of the present system to provide the correct video levels to the system independent of the source levels. This compensates for source cable capacitance and thereby improves the high frequency response of the channels.

Each trader cluster may comprise from one to eight trader work stations which communicate via the single looped fiber optic cable. The communications data transmitted over the fiber loop includes wire service data, trader interactive data, trader status data, electronic mail and other data services, along with digitized voice communications, including telephone communications, intercom and foreign exchange voice channels.

The information services which can be handled by the system may include broadcast "view only" services, such as Reuters News, Garban, Dow Jones and the like, or interactive services such as Telerate, Quotron, FBI and others. Interactive services will typically be handled by a dedicated communications processor which will act to accept requests from the channels, via the cross switch matrices, allocate available channels and/or page data, and perform protocol translation which may be required for each service.

In addition, internal data services are used to monitor trader activity or to provide additional information or services to the traders. The video distribution equipment permits the traders to view data which is only provided in analog video form from certain suppliers.

The system according to the present invention may be expanded either by adding additional work station clusters and associated communications switching matrices, or by adding additional communication channels or voice channels to each switching matrix, which may require the transmission rate to be increased within the fiber loops to the work stations.

Figures 1, 9:
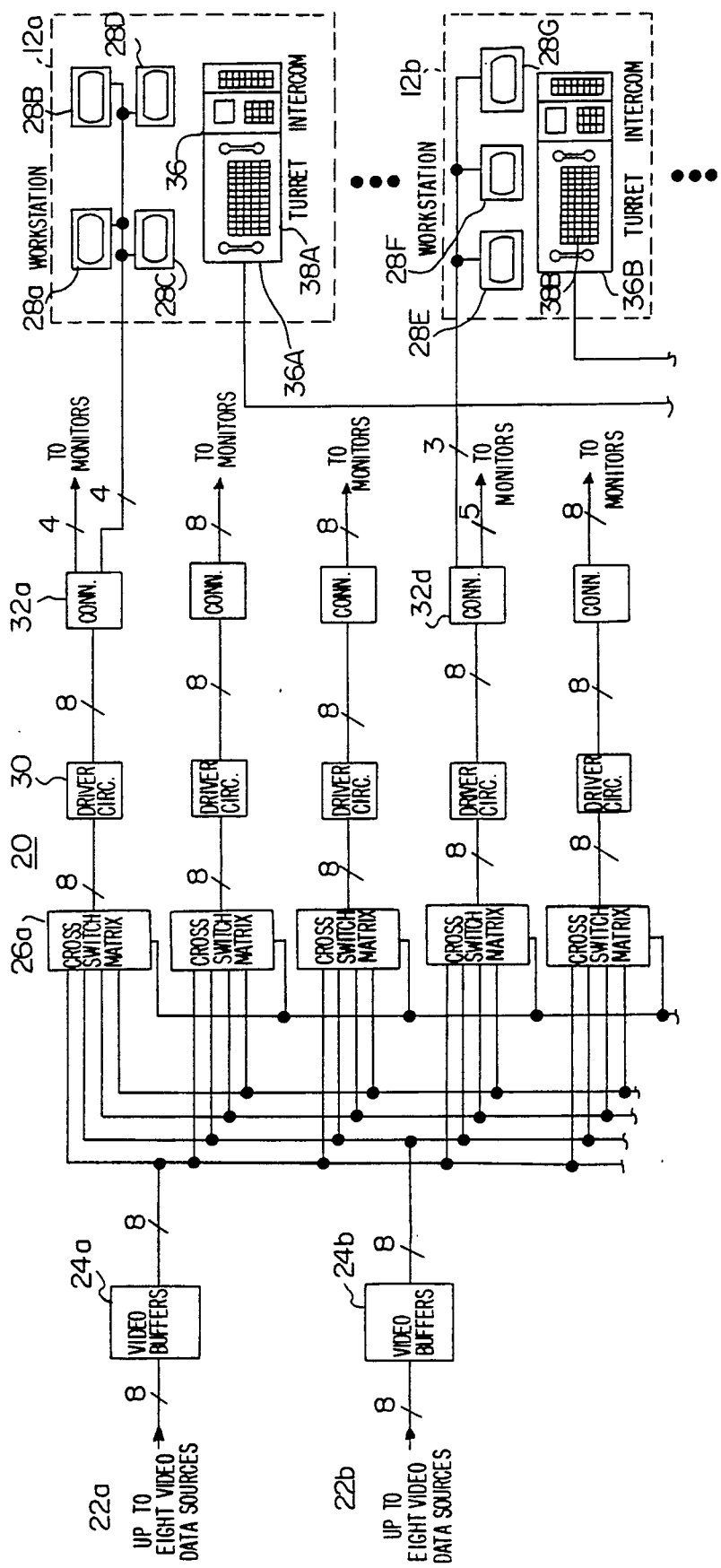
FIG. 9 is a diagrammatic illustration of a preferred embodiment of a system with a video switch exchange in accordance with the present invention.
Figures 2, 9:
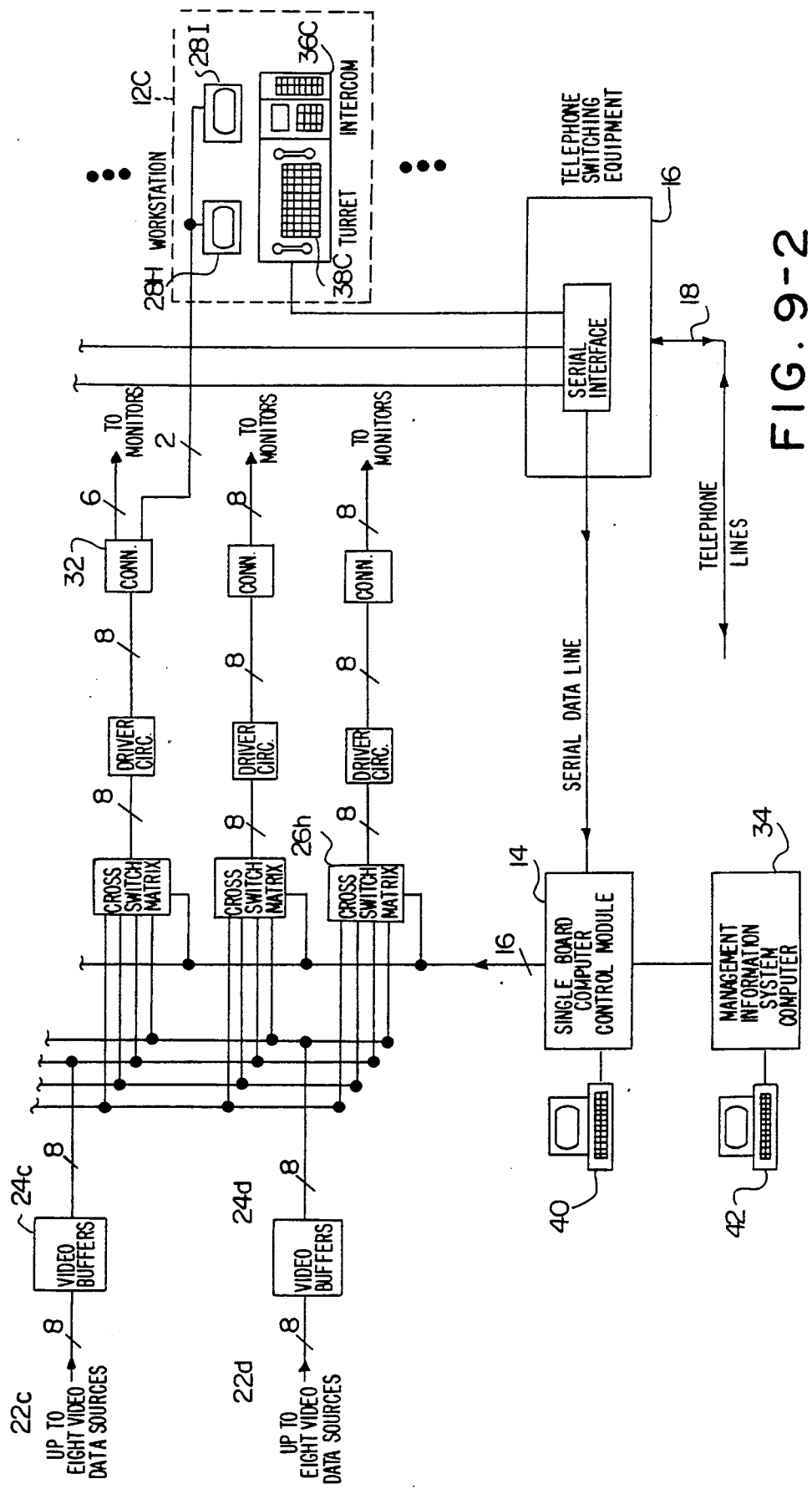

Turning now to FIG. 9, the basic configuration of the system 10 in accordance with the present invention includes a plurality of work stations 12A, 12B, 12C, a control console 14 and a serial interface 16 between control console 14 and work stations 12A-12C. Interface 16 uses conventional telephone switching equipment and further receives information from data services over a telephone network 18. System 10 further comprises a video switch exchange 20 connected between the work stations 12A-12C, control console 14 and a plurality of video data networks 22A-22D, each of which may supply up to eight video data sources. Video switch exchange 20 is operative in response to requests from work stations 12A-12C and control signals from control console 14 to provide selective ones of the video data sources to selected ones of the work stations. Video switch exchange 20 therefore includes a plurality of video buffer circuits 24A-24D connected to respective ones of the video data networks 22A-22D for adjusting the level of the video data signals to the appropriate video levels used in system 10, and further includes a plurality of cross switch matrices 26A-26H. The cross switch matrices 26A-26H operate as a switching circuit for connecting a selected one of an input line from one of the video buffers 24A-24D to a selected output line directed to one of work stations 12A-12C. More particularly, as described in greater detail below, each work station 12A-12C includes a plurality of monitors 28A-28I. Each output line is connected to a particular monitor 28A-28I within the work stations 12A-12C. Each cross switch matrix 26A-26H provides eight lines through a respective driver circuit 30A-30H to a respective connection module 32A-32H. The output lines from the connection modules 32A-32H are assigned to individual ones of the monitors 28. As shown, work station 12A includes four monitors 28A-28D. Therefore, communication module 32A provides four output lines connected to respective ones of monitors 28A-28D. Correspondingly, work stations respectively 12B and 12C include three monitors 28E-G and 28H-I, so that communication modules 32D and 32F three lines and two lines to work stations 12B, 12C, respectively.

System 10 further includes a management information system (MIS) computer 34, which may be a personal computer used to sample and store the daily video activity.

In addition to the monitors 28, each work station 12A-12C includes a turret and intercom module 36A-36C which receives respective input lines through interface 16 from interface 18. Each turret/intercom module 36 includes a keyboard 38A-38C for entering user requests by the operator at the work station. Correspondingly, control module 14 includes a PC having a keyboard 40 and MIS computer 34 includes a keyboard 42 for entering commands by the operator.

Figure 10:
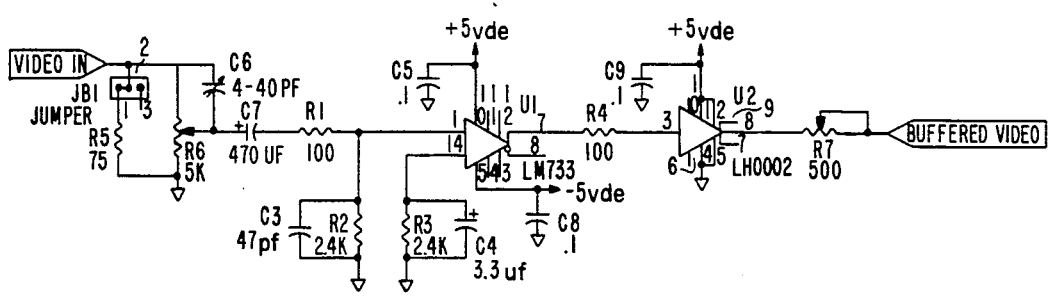
FIG. 10 is a schematic diagram of a video buffer circuit in the system of FIG. 9.

FIG. 10 illustrates an advantageous embodiment of video buffer 24A. All of video buffers 24A-24D are of identical construction and differ only in the particular input video data lines supplied thereto, and so only video buffer 24 will be described. Video buffer 24A has two functions, to match the impedance between the video source and the input to the video matrix circuitry and to amplify the input video signals to appropriate levels to compensate for the capacitive loses in the input cables.

Figure 11:
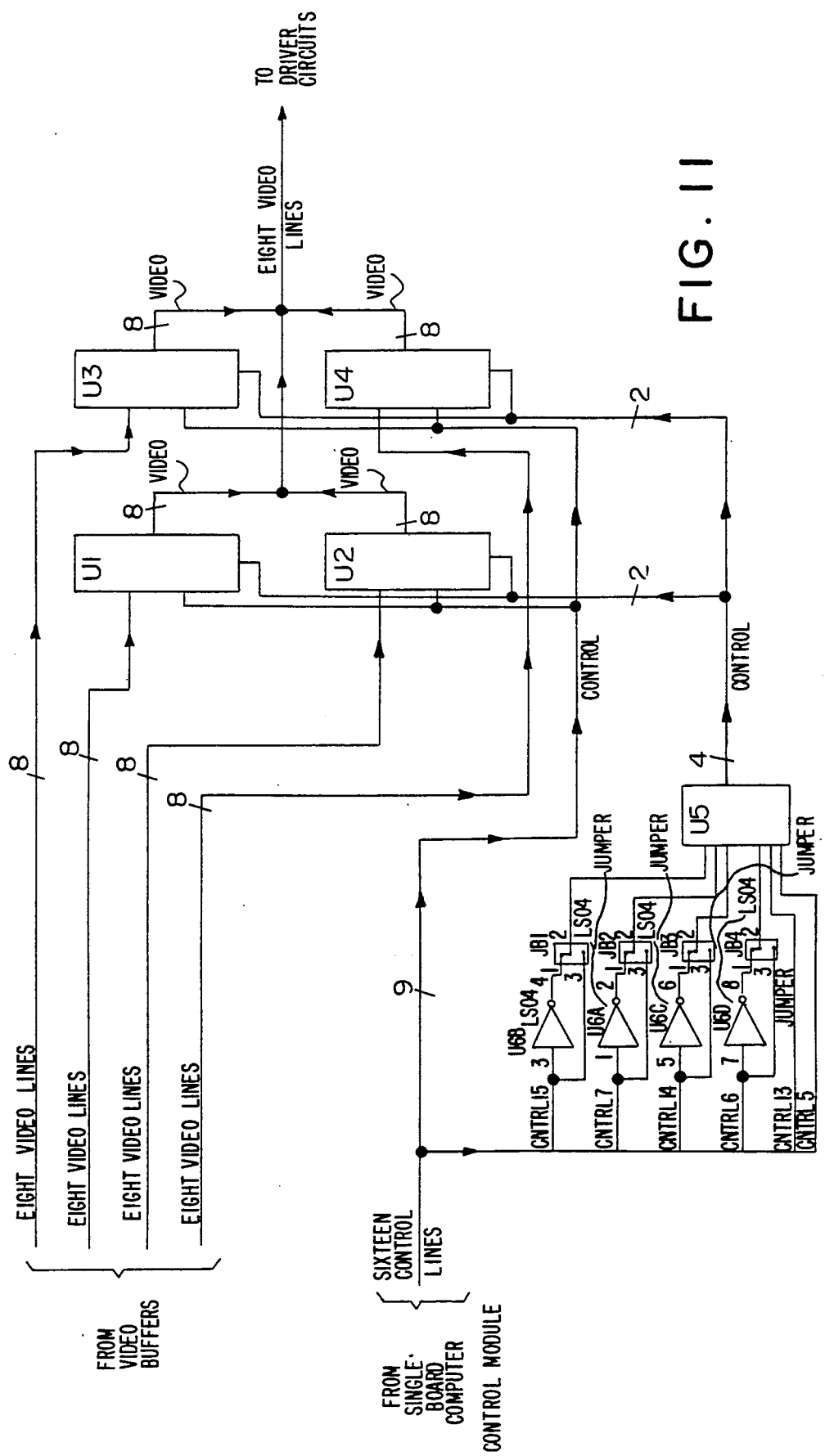
FIG. 11 is a schematic diagram of a cross switch matrix in the system of FIG. 9.

FIG. 11 is a schematic diagram of a cross switch matrix 26A. Again, all cross switch matrices 26A-26D are of identical construction and differ only in the connections to which the respective input and output lines are connected. As illustrated in FIG. 11, cross switch matrix 26A receives all eight video lines from each of the 4 video buffers 24A-24D. Thus, four sets of eight channels are provided and each set is supplied to the inputs of four 8×8 analog switches U1-U4. In addition, control module 14 provides command signals through 16 control lines. Under this control, a connection can be made through any of switches U1-U4 from any video source to any or all user output ports. Addressing is decoded via switch U5 and sets the chip enable for the addressed monitor 28.

Figure 12:
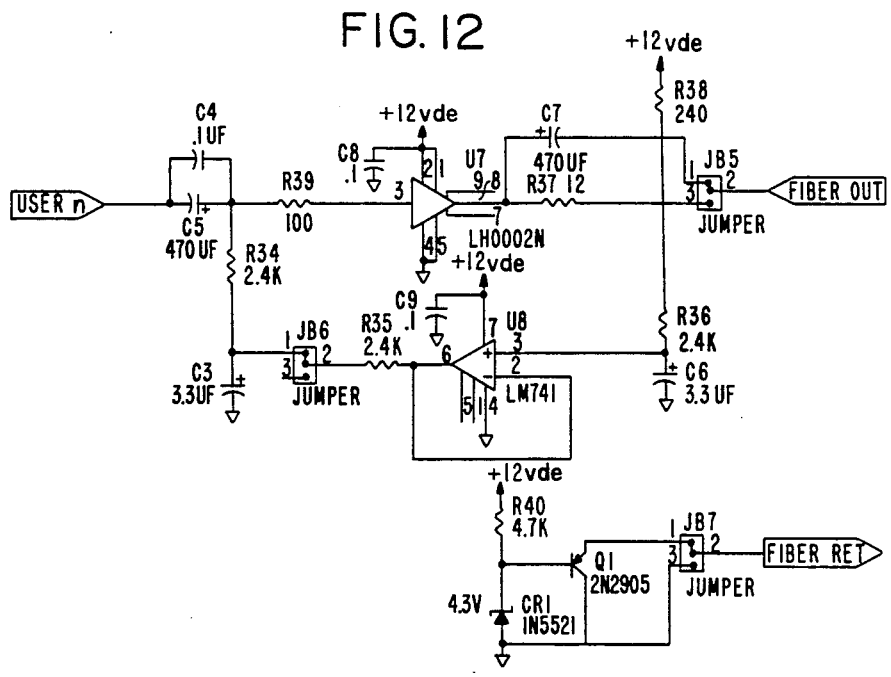
FIG. 12 is a schematic diagram of a video driver circuit in the system of FIG. 8.

FIG. 12 illustrates driver circuit 30A, and once again it is noted that driver circuits 30A-30H are of identical construction.

System 10 enables a number of highly advantageous operating routines which facilitate the flow of desired information to each work station 12A-12C and the coordination of the various work stations by the control console 14. These routines include a video scan routine, a channel forcing routine, a set system configuration routine, a set groups routine, a blackout routine, a blackout management routine, a monitor routine and an MIS routine. The flow charts and computer screens produced in accordance with these routines are illustrated in FIGS. 1A-7B, respectively and will now be described.

Each of these routines, with the exception of the MIS routine, is controlled by the operation of keyboard 40 at control console 14, while the MIS operation is controlled by keyboard 42 at MIS computer 34.

Each of these operations is accessed through a Main Menu screen, which is the default screen presented at control console 14. The main menu is illustrated in FIG. 13, and the selection of operation through keyboard 40 uses both cursor control and the entry of selection numbers. For example, when the main menu is displayed, the video scan operation is accessed by entering the number "1". The main menu may be accessed at any time by hitting the letter "Q" for "Quit" either once or twice, depending upon the level within the operation under performance.

Turning now to FIG. 1A, the video scan operation is the operation in which any video source may be switched to any monitor 28 from control console 14. The presentation screen, illustrated in FIG. 1B, presents a chart in the form of a matrix of information, in which the channels, that is the video sources, are displayed in the rows and the monitors, herein termed users, are displayed in columns. By moving the cursor, a selected source may be connected to a selected user. The cursor appears as an illuminated rectangle with the underlying data in reverse illumination. As the cursor moves from one position to another within the matrix, the connection represented by the old cursor location is broken and the connection represented by the new cursor location is made. This breaking/making of connections is achieved by cross switch matrices 26A-26H, as illustrated in FIGS. 9 and 11.

Referring back to FIG. 1A, the video scan operation is performed under the control of a program 100, which is entered in step 101 when the selection number "1" is entered on the main menu. Upon entry to program 100, it will be understood that a set of old user/channel connections already exists This set of user/channel connections may be empty if the system has been initialized, or may represent a present condition of the system which it is desired to change. Therefore, only one user/channel connection is altered in each loop through program 100. This is achieved first in step 107, in which the zero connection is made while storing the old user/channel connections. These user/channel connections are left undisturbed until steps 14 and 15. When a valid entry at step 109 indicates a new connection, the old connection is broken by disconnecting the selected user from its previous channel and by reconnecting that user to the new selected channel. The remaining users and channels remain undisturbed. It will be understood, of course, that the same channel may be supplied to two or more users at the same time.

At step 102, the operator is requested to enter the channel number and user number. It is to be remembered that the user number identifies not the particular work station, but rather a particular monitor At step 103 it is checked whether the numerical entry of channel and user number is valid, and if it is invalid an appropriate error signal is displayed in step 104 and program 100 returns to step 102. However, if the entry is valid, any stored error indications are cleared in step 105, the previous screen and display matrix is cleared in step 106 and in step 107 the cursor is placed at the origin, as illustrated in FIG. 1B. This is effective to make the zero connection of channel number 0 to user number 0. At step 108, program 100 checks whether the operator wishes to quit the video scan operation, which will occur when the entry is Q. If Q has been entered, then in step 109 the old user/channel connections, which here would be those pending before step 107, are restored, in 110 the main menu is restored and in step 111 the control console exits the video scan routine.

However, if a quit command was not entered, at step 109 it is checked whether a new user/channel connection has been requested. That is, control console 14 determines whether the cursor has been moved from the origin to indicate a new connection. If the entry is invalid, the errors are displayed in step 112 and program 100 returns to step 108. However, if the entry was valid, any errors are cleared in step 113, the old user/channel connection is broken in step 114, the new user/channel connection is made in step 115 and a report on the updated user/channel connection is provided to control console 14 in step 116. these charged connections are sensed by the change in configuration of switches U1-U4 When the control program 100 then returns to step 108, the user/channel connection made in step 115 is now an old user/channel connection with the remaining connections and will be restored in step 109 upon quitting the video scan routine.

Using this routine, the only valid entries are "8" to move the cursor up, "2" to move the cursor down, "4" to move the cursor left, "6" to move the cursor right and "Q" to quit. The presentation screen of FIG. 1B indicates this control information at the bottom of the displayed matrix of users vs. channels. The other presentations screens similarly display the valid possibilities for entry. Therefore, at step 103, or at step 109 defined below, any entry created by hitting any other key on keyboard 40 will be detected as an invalid entry.

Figure 2A:
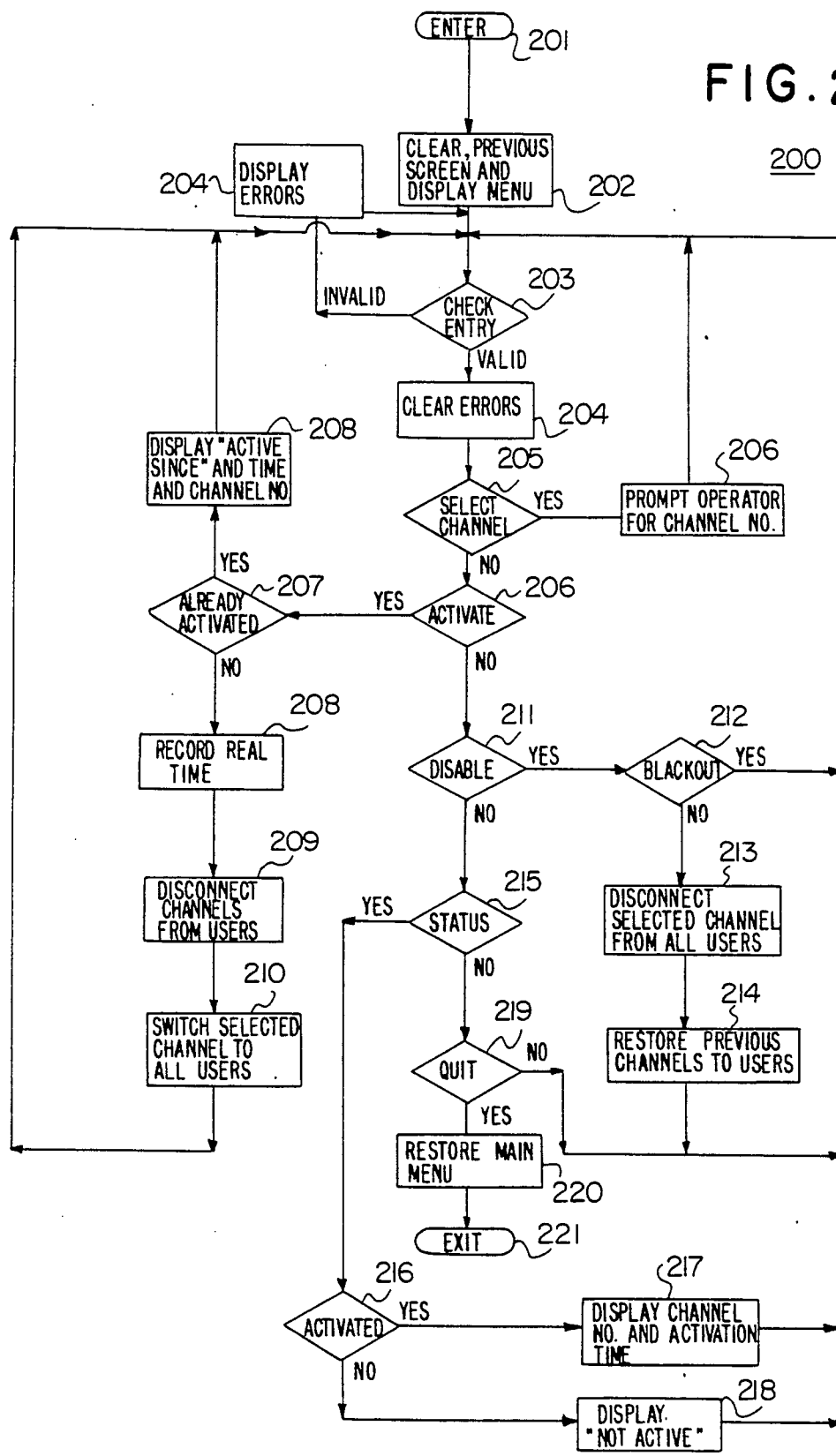
FIG. 2A is a flow chart of a channel forcing operation in accordance with the present invention.

FIG. 2A illustrates a channel forcing operation in which the operator may force one source channel to all users at once. This is primarily a maintenance operation to check that the source is adjusted properly for display at any or all of the monitors 28 of the users.

The presentation screen is illustrated in FIG. 2B, and it prompts for the channel identification of the channel to be forced. Once a channel is forced, it may be disabled by any other menu entry, or it may be left active. A status report capability will display the last forced channel and when it was forced. As indicated in FIG. 2B, the only valid inputs are 1-5 for the channel forcing operation.

A flow chart of program 200 is illustrated in FIG. 1A. Program 200 is entered at step 201 by the entry of 2 in the main menu, in step 202 the previous screen is cleared and the presentation menu of FIG. 2B is illustrated. In step 203 it is checked whether the entry is valid, and if it is not, an error display is presented in step 204 and control returns to step 203. If the entry is valid, any stored errors are cleared in step 204 and then the nature of the valid entry is determined in the following steps. Thus, if the entry was "1" to select a channel, this is determined in step 205 and in step 206 the operator is prompted to entry the channel number. If the entry was "2" to activate the channel, this is determined in step 206, and in step 207 it is determined whether a channel has already been activated. If so, then a new channel cannot be selected and forced unless the old channel is disabled, and therefore in step 208 an error display of "ACTIVE SINCE", the time and the channel number will be displayed and then control will return to step 203. However, if at step 207, it is determined that no channel has already been activated, then the time of activation is recorded in step 208, the previous user/channel connections are disconnected in step 209, and the selected channel is connected to all users in step 210, and then control returns to step 203.

If at step 206, the entry was determined not to be an activate request, then in step 211 it is determined whether a "3" has been entered to disable the forced channel. If so, in step 212 it is determined whether a blackout routine is in operation. This routine is described below in connection with FIGS. 5A and 5B. If the blackout routine is in effect, control returns to step 203. Otherwise, in step 213 the previously selected and forced channel is disconnected from all the users, in step 214 the previous user/channel connections are restored, and then control is returned to step 203.

If at step 211 it was determined that a disabled request was not entered, then in step 215 it is determined whether "4" has been entered as a status request. If so, in step 216 it is determined whether the channel forcing operation has been activated. If it has, the channel number in activation time are displayed in step 217. If it has not, the words "NOT ACTIVE" are displayed in step 218, and in both cases the control returns to step 203.

Finally, in step 219, it is determined whether the valid entry, if no other entry, is "5" to quit. If for any error it is determined that this entry is not 5, control returns to step 203 to await a new entry. However, since "5" is the only remaining valid entry, in step 220 the main menu is restored and then in step 221 program 200 ends.

System 10 has three power on or reset defaults. The first is the host system command length. Some turret systems, such as Positron, vary in their communication protocols with the video switch exchange 20. To accommodate this, system 10 provides a software switch for either a two or three digit command length code, the default being a three digit code. Secondly, there is a default channel for screen zero. This allows at least one screen to be programmed as an active channel for every user. In the present embodiment this channel is selected as channel zero. Thirdly, there is the system configuration. System 10 allows in the illustrated embodiment up to four monitor screens 28 to be logically associated in any one work station 12A-12C with a turret/keyboard module 38A-38C. This logical assignment is achieved using the set system default presentation menu, illustrated in FIG. 3C, and is stored in non-volatile memory to remain active indefinitely. As in video scan program 100, changes are made using the cursor key and are prompted by a display at the bottom of the presentation screen.

Initially, the set system default menu is entered from the main menu by entry of 7. This menu merely offers a choice of setting the turret command by entering 1, setting the default channel by entering 2, or entering the set system configuration program by entering 3. This will result in the display of the presentation screen of FIG. 3C.

Figure 3A:
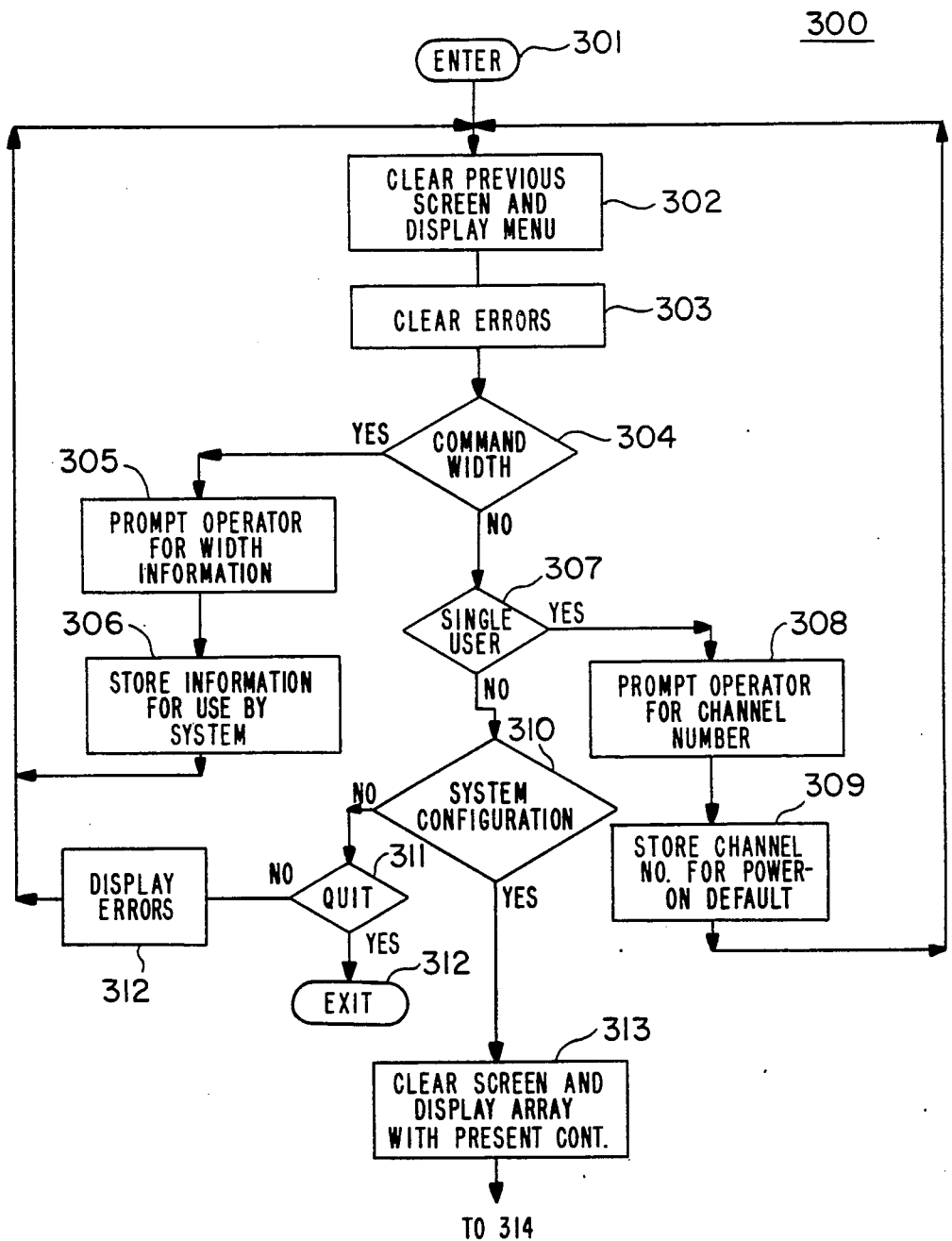
FIG. 3A is a first portion of a flow chart of a set system default operation in accordance with the present invention.
Figure 3B:
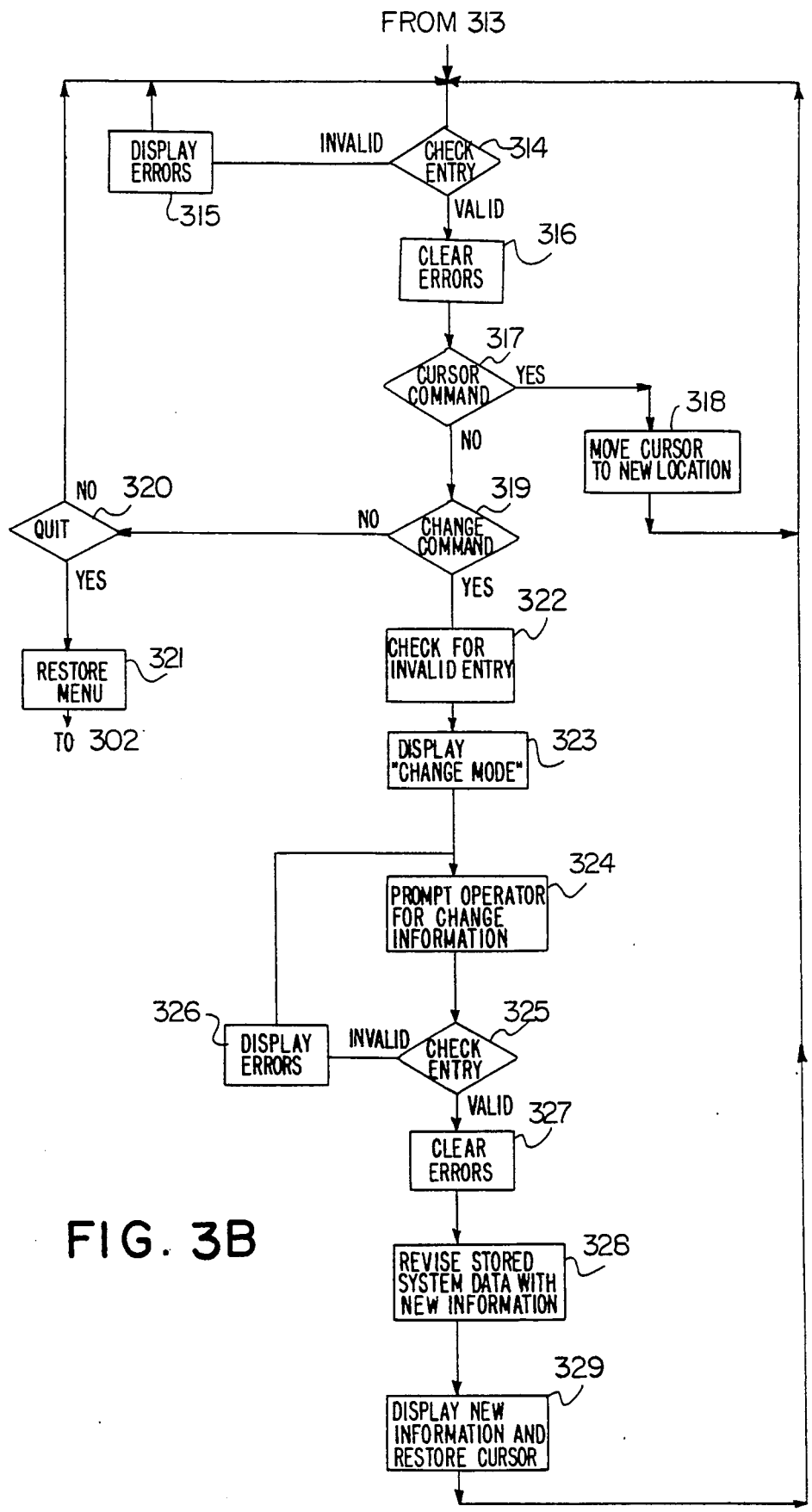
FIG. 3B is a second portion of the flow chart of FIG. 3A.

A flow chart of the entire set system defaults program 300 is illustrated in FIGS. 3A and 3B. Upon entry of 7 from the main menu, program 300 is entered at step 301, the previous screen is erased and the system defaults menu is presented. At step 303 errors are cleared and at step 304 the entry in the set systems default menu is checked. If the entry is 1, in step 305 the operator is prompted to enter the width information, in step 306 the information is stored for use by the system, and the control returns to step 304 through steps 302 and 303. If a command width request was not entered, then at step 337 it is determined whether the single user request has been entered by entry of 2. If so, in step 308 the operator is prompted to enter the channel number, in step 309 the entered channel number is stored for a power-on default and control returns to step 304. If a step 307 a single user request was not received, then at step 310 it is determined whether a system configuration request was received. If not, in step 311 it is determined whether a quit request was received and if so program 300 ends at step 312. If at step 311 it is determined that a quit request was not received then the entry was invalid, an error message is displayed at step 312 and control returns to step 302.

If at step 310 a system configuration request is recognized, then at step 313 the screen is cleared and the presentation screen illustrated in FIG. 3C is displayed.

Referring now to FIG. 3B, upon an entry at step 313, the entry is checked at step 314, and if the entry is invalid an error message is displayed at step 315 and control returns to step 314. If the entry is valid, the errors are cleared at step 316 and the type of entry is determined in step 317. That is, if it is a cursor command entry, then in step 318 the cursor is moved to the selected new location and control returns to step 314. If it is not a cursor command entry then at step 319 it is determined whether it is a change command to change the system configuration. If not, at step 320 it is determined whether the entry was a quit command. If so, program 300 ends at step 321. If not, which would be an error condition, control returns to step 314.

If at step 319 a change commend is detected, then in step 322 there is a check for an invalid entry (question whether this was done 314). In step 323 the words "CHANGE MADE" are displayed.

As shown in FIG. 3C, each of workstations 12A-12C (or more generally turrets 0-16) receives a default assignment of four users. A change in the user assigned to a particular default may be made by moving the cursor to the desired position within the chart and changing the number of the user identified therein. The current position of the cursor is displayed below the chart as "Turret=—, CRT=—."

In step 324, the operator is prompted to enter the change information. In step 325 it is checked whether the entry is valid, and if not an error is displayed in step 326 and control is returned to step 324. If the entry is valid, errors are cleared in step 326, the stored system data is revised with the new information in step 327 and in step 328 the new information is displayed and the cursor is restored to its initial position at the origin. Control then returns to step 314. Entry of a quit command at this point returns the program to step 302 and the previous set systems default menu. A second quit command then returns control to the main menu.

Another operation of system 10 according to the present invention is the set groups operation. Following Trader's Floor tradition, system 10 allows groups of traders headed by a leader to be considered a logical entity, and as such the lead trader has control of one monitor in each of his group's members' work stations. The member work stations are also termed slave work stations. For example, if the leader at work station 12A considers the display on channel 5 to be important to all of its group's members, then with a single command he can connect channel 5 to monitor (or user) number 0. This display will remain active until the group leader removes it from his screen. The partition of the work stations into group members and leaders in accomplished using the set groups menu. Using the cursor keys, any group member can be assigned to any group leader, and a list of the active groups and their leaders may also be obtained.

The presentation screen for the list display is illustrated in FIG. 4C and the presentation menu for setting the leaders and their groups is illustrated in FIG. 4D.

Figure 4A:
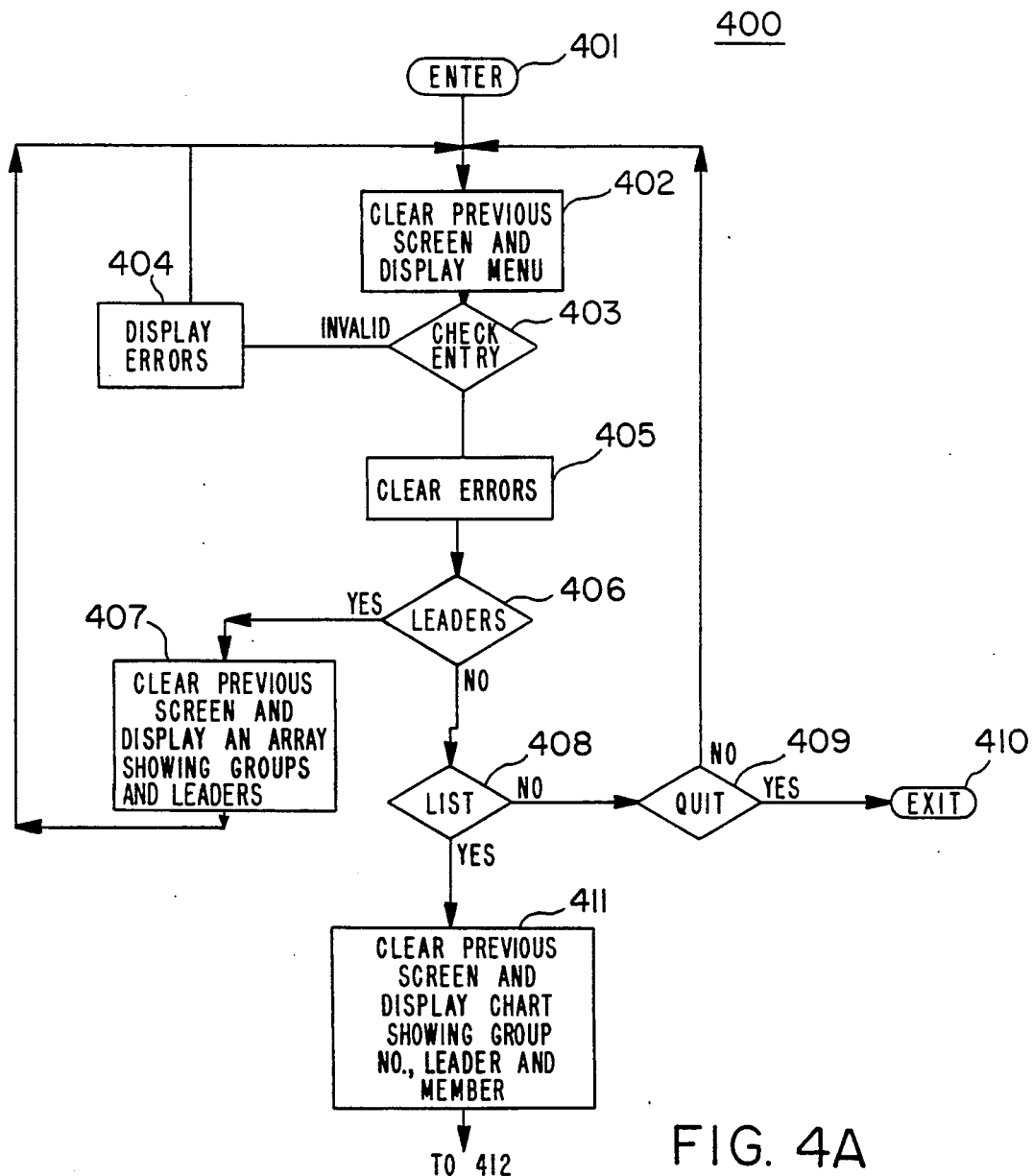
FIG. 4A is a first portion of a flow chart of a set groups operations in accordance with the present invention.
Figure 4B:
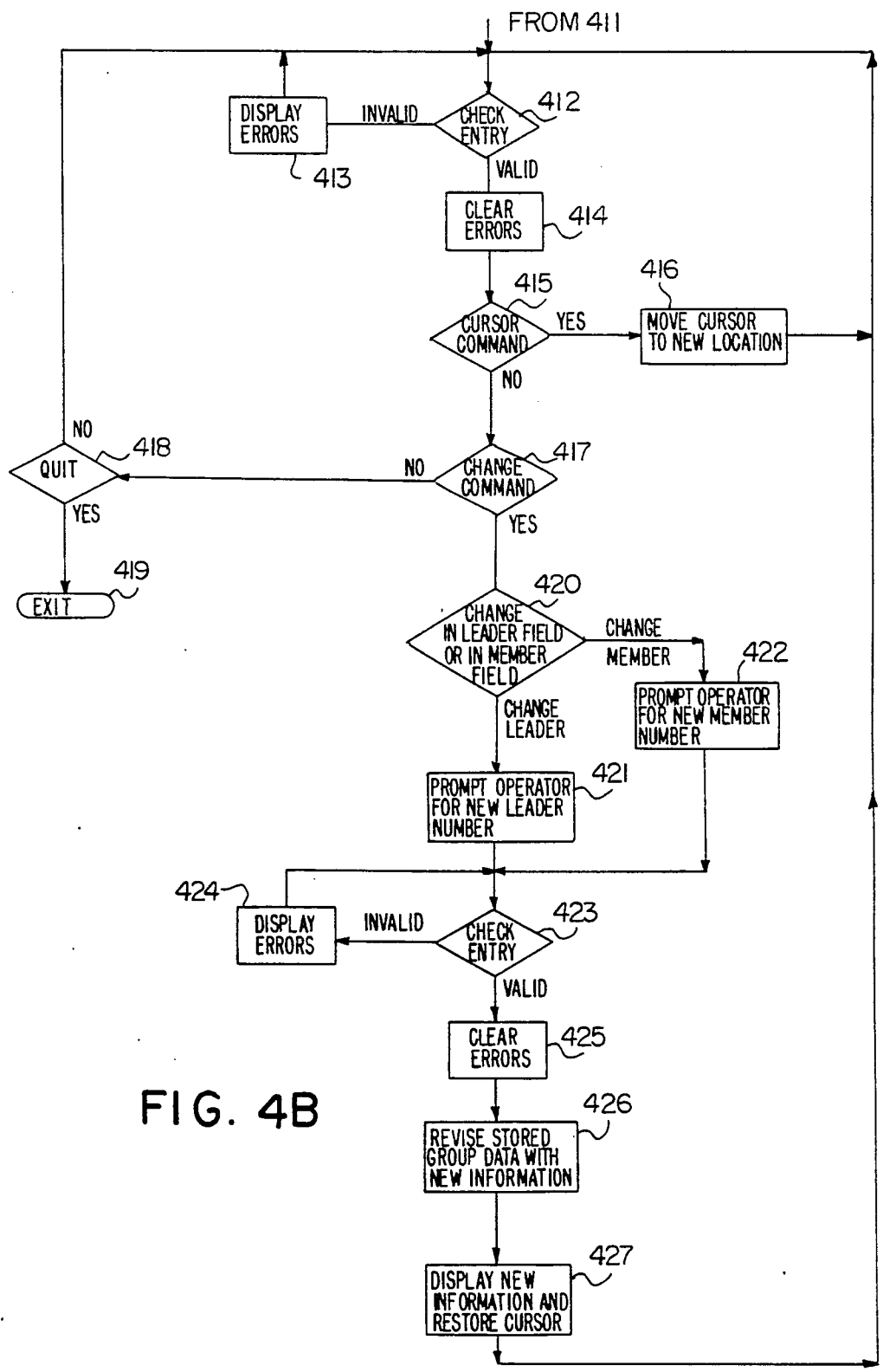
FIG. 4B is a second portion of the flow chart of FIG. 4A.

A set groups program 400 is illustrated in FIGS. 4A and 4B. Program 400 begins when 8 is entered on the main menu, and begins at step 401. At step 402, the previous screen is cleared and a first menu permitting entry of a request for a leader display or a listing is provided. At step 403, the entry is checked for validity, and if the entry is invalid and error display is provided at step 404 and control returns to step 402. If the entry is valid, the errors are cleared at step 405 and at step 406 it is determined whether a leader's array has been requested. If so, the presentation screen of FIG. 4C is displayed in step 407, illustrating the leaders assigned &o the different groups, and control returns to step 402. If a leader's array has not been requested at step 406, then in step 408 it is determined whether a listing has been requested. If not, then in step 409 it is determined whether a quit request has been entered and if so program 400 exits at step 410. If not, in an error condition, control returns to step 402. If, however, at step 408 a listing request is recognized, then in step 411 the previous screen is cleared and a chart is displayed showing the group numbers, leaders and members. This chart is illustrated in FIG. 4D.

Referring now to FIG. 4B, at step 412 the entry into the chart displayed at step 411 is checked. If the entry is invalid, an error display is provided at step 413 and control returns to step 41 to await a new entry. If the entry is valid, the errors are cleared at step 414, and step 415 determines whether the entry was a cursor command. If it was, then the cursor is moved to the new location in step 416 and control returns to step 412. If it was not a cursor command, then in step 417 it is determined whether a change command was entered. If not , then in step 418 it is determined whether a quick command was entered and if so, program 400 exits at step 419. If a quit command was not entered, then in an error condition, control returns to step 412.

However, if at step 417 a change command is recognized, then in step 420 it is determined whether the change command is a change of leader or change in member command. If it is a change in leader command, then the operator is prompted for a new leader number in step 421, while if it is a change of member command the operator is prompted for a new member number in step 422. In either case, in step 423 it is checked whether the entry was valid, and if it was invalid an error display is provided at step 424 and control returns to step 423 to await the entry of a new leader/member number.

If the leader/number entry was valid, then in step 425 the errors are cleared, in step 426 the stored group data is revised with the new information, and in step 427 the new information is displayed and the cursor is restored to its zero condition. Control then r<turns to step 412 to determine if a further change in group membership is desired.

The present invention provides an advantageous blackout routine. The CRT screens of the monitors 28, if left on for an extended period of time with any particular display, will begin to present the marks of burns in their phosphorescent surfaces produced by the constant excitation of the scanning electron beam. This causes loss in both the focus and luminosity of the displayed images, so that the life expectancy of the CRT is dramatically reduced. Furthermore, experience has shown that the majority of the video displays present on the trader floor remain on overnight. To reduce the risk of these burns, system 10 according to the present invention provides a programmable time interval, called the "blackout" interval, during which all video sources are disconnected from all users. While this is not the equivalent of a total power down, it has the practical effect of blanking out all of the screens. Consequently, the CRT screens of the monitors 28 will be protected from burns during the nightly period of no activity on the floor.

The blackout routine provides a presentation screen, illustrated in FIG. 5B, which is similar in structure and operation to the channel forcing screen illustrated in FIG. 2B. A flowchart of the program 500 for the blackout routine is illustrated in FIG. 5A.

More particularly, the blackout routine is entered when 9 is entered in the main menu screen illustrated in FIG. 12. Program 500 begins at step 50[and in step 502 the previous screen is cleared and the menu of the presentation screen illustrated in FIG. 5B is displayed. In step 503 the entry is checked for validity, and if it is invalid, an error display is provided in step 504 and control returns to step 503 to await the next entry. If the entry is valid, the errors are cleared at step 505 and then the identification of the valid entry is determined. At step 506, it is determined whether the entry is a set entry. If it is, the operator is prompted at step 507 to enter the start time. Step 508 checks whether the entered start time is valid, and if it is not, at step 509, an error display is provided and control returns to step 507. If the start time is valid, errors are cleared at step 51( , the start time is stored in step 511 and in step 512 the operator is prompted to enter the blackout stop time. In step 513, the entered stop time is checked for validity, and if it is invalid, an error display is provided in step 514 and control returns to step 512. If the stop time is valid, errors are cleared in step 515 and the blackout stop time is stored in step 516 and control is returned to step 503.

If at step 506 the entry is not a set request, at step 517 it is determined whether it is a now request, that is, to determine whether the blackout should begin immediately. If so, all the screens are cleared at step 518 and control returns to step 503. If the request is not a now request, then at step 519 it is determined whether the request is a restore request. If so, the blackout is ended and in step 520 all the screens are turned on to the last channel selected. If the request was not a restore request, then in step 520 when it is determined whether the request was an activate request. If so, then the "blackout" flag is set in step 522 and control is returned to step 503. If the request was not an activated request, then in step 523 it is determined whether it was a disabled request. If so, the "blackout" flag is reset in step 524 and control is returned to step 503. If the request was not a risable request, then in step 525 it is determined whether the request was a status request. If so, then step 526 determines whether the blackout flag has been set or reset. If it was set, then the word "active" in the start and stop times are displayed in step 527, while if the blackout flag was reset the word "disabled" is displayed in step 528, and in either case control returns to step 503. Finally, in step 529 it is determined whether a quit request was received. If so, then program 500 ends at step 530. If not, then, in an air condition, control returns to step 503.

Figure 6:
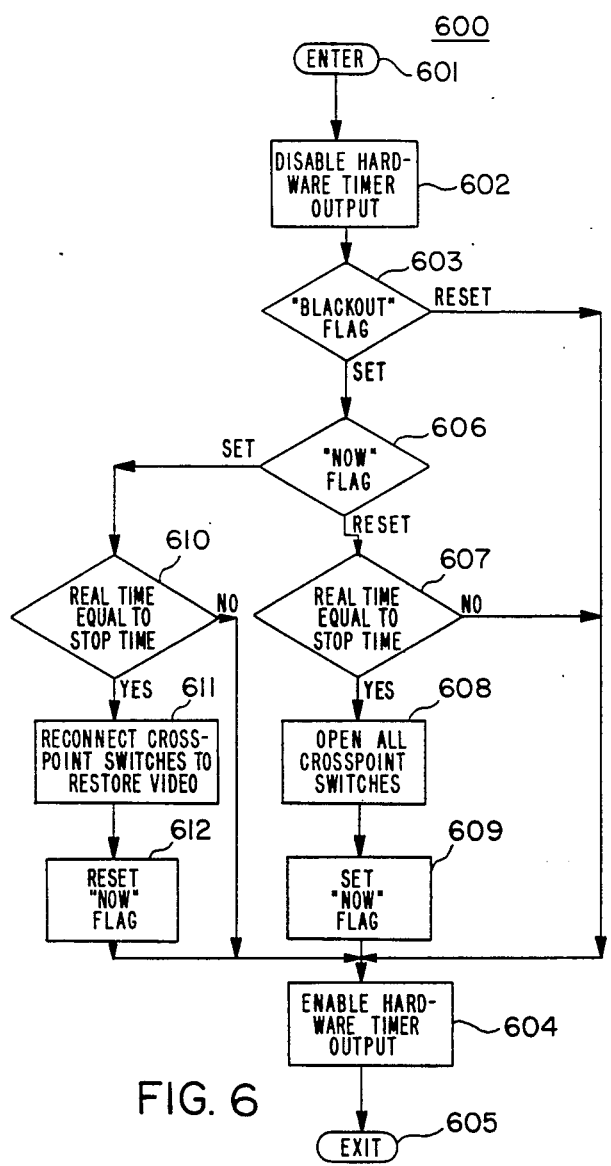
FIG. 6 is a flow chart of a blackout management operation in accordance with the present invention.

FIG. 6 illustrates a blackout routine through which control console 14 is responsive to the start and stop times and the "blackout" flags set during the blackout operation. Blackout management program 600 begins at step 601 and then in step 602 the hardware timer output is disabled. This may occur, for example, under the control of the console operator at the end of the trading day. In step 603, it is determined whether the blackout flag is set or reset. If it is reset, then no blackout operation is to occur, and control goes to step 604 in which the hardware timer output is enabled and then the program ends at step 605. If, however, the blackout flag has been set, then it is determined in 606 whether the "now" flag has been set. If the "now" flag is reset, then in step 607 it is determined whether the real time is equal to the start time. If not, then control proceeds to step 604. If the real time is equal to the start time, then in 608 all cross point switches are opened to disconnect all users from their channels, and in 609 the "now" flag is set. If in step 606 the "now" flag is set, then it is determined whether, in step 610, the real time is equal to the stop time. If not, control proceeds to step 604, while if the real time is equal to the stop time, in step 611 the cross point switches are reconnected in their previous configuration to restore the video signals and the "now" flag is reset in step 612. Console 14 repeatedly calls step 600 to determine and control the blackout of monitors 28.

A monitor menu and routine are provided to show the floor video activity in real time. The menu is illustrated FIG. 7B. When this menu is activated, every video request is shown on the screen as a chart in a matrix form, one matrix form per user, and the cursor moves over the last change. When the cursor moves to another location on the screen, it leaves behind the last change of the previous user request. No operator intervention is required in this mode and the only action permitted is the exit to the main menu.

Figure 7A:
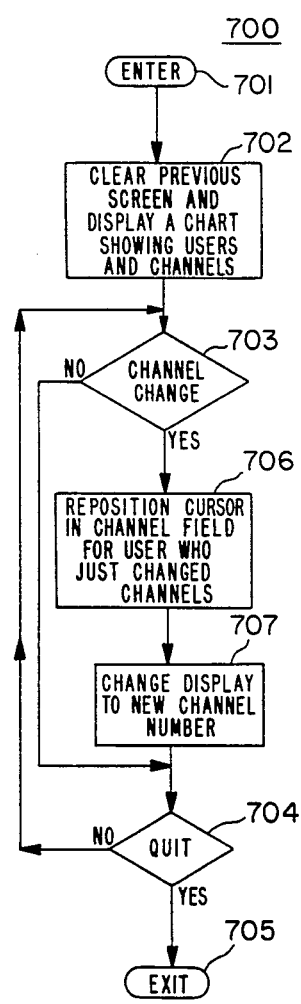
FIG. 7A is a flow chart of a monitor operation in accordance with the present invention.

Thus, a flowchart for monitor program 700 is illustrated in FIG. 7A. This program begins at step 701 and in 702 the previous screen is cleared and a display of a chart showing the users and channels is displayed (FIG. 7B). In step 703, it is determined whether a change cursor command has occurred and if not, in step 704 it is determined whether a quit request has been received, so that the program ends at step 705. If, however, at step 703, a change cursor command has been received, then at step 706, the cursor is repositioned in the channel field for the user who just changed the channels, and in step 707 the presentation screen is changed to display the new channel number, and then control proceeds to step 704.

Figure 8A:
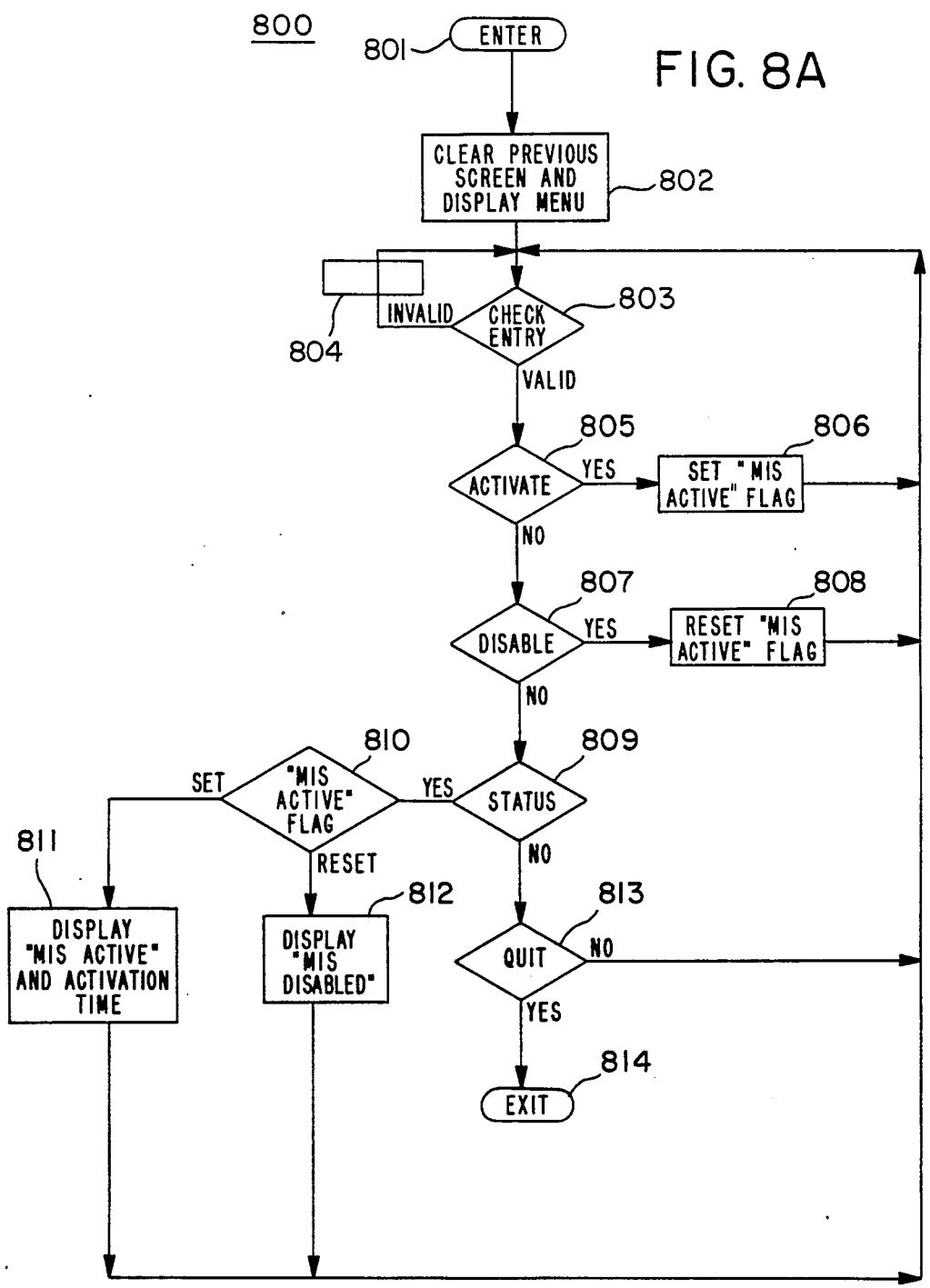
FIG. 8A is a flow chart of a management information system operation in accordance with the present invention.

System 10 has a management information system port in control console 14. Through this port, a separate computer, such as MIS computer 16, can sample and store the daily video activity. This function is enabled by an "activate" command, and once activated, all video commands are prepared in a special form and presented to the MIS port. A status report command will return to the terminal the status of the MIS function (active or disabled) and the time when it was last activated. The flowchart for the MIS operation is illustrated in FIG. 8A, and the presentation screen therefor is illustrated in FIG. 8B.

Program 800 for the MIS operation begins at step 801 and then in step 802 the previous screen is cleated and the menu illustrated in FIG. 8B is displayed. If the command entry is invalid in step 803, then in system 804 an error display is presented and control returns to step 803. If the entry is valid, then in step 805 it is determined whether this is an activate request. If yes, then the "MIS active" flag is set in step 806 and control returns to step 803. If the entry is not an activate request, then in step 807 it is determined whether it is a disabled request, and if so the "MIS active" flag is reset in step 808 and control is returned to step 803. If the entry is not a disable request, then in step 809 it is determined whether it is a status request. If so, then in step 810 it is determined whether the "MIS active" flag is set or reset. If it is set, then the words "MIS active" and the activation time are displayed in step 811, while if it is reset the words "MIS disabled" are displayed in step 812, and in either case control returns to step 803 If instep 809 it is determined that the entry was not a status request, then in step 810, it is determined whether the entry was a quit request, and if so the program ends at step 814. If not, then, in an air condition, control returns to step 803.

Although the present invention has been described in connection with a single preferred embodiment, it will be apparent that many changes and modifications may be made therein without departing from the spirit and scope of the present invention, which is to be determined by reference to the appended claims.

We claim:

1. An apparatus for switching video signals from input lines to output lines, comprising:
   control means for selectively setting a blackout start time and for selectively setting a blackout stop time;
   first comparing means for comparing the blackout start time with actual time;
   second comparing means for comparing the blackout stop time with actual time; and
   switching means for connecting the input lines to the output lines and for disconnecting the input lines from the output lines, said switching means being responsive to said first comparing means to disconnect all input lines from all output lines when the actual time equals the blackout start time, said switching means being responsive to said second comparing means to reconnect the input lines to the output lines when the actual time equals the blackout stop time.

2. An apparatus as recited in claim 1, further comprising means for determining which input lines were connected to which output lines prior to disconnection and means for storing and recalling connection information, wherein said switching means is responsive to said storage and recall means to restore prior connections when the actual time equals the blackout stop time.

3. An apparatus as recited in claim 1, further comprising a real-time clock, said real-time clock is applying the actual time to said first and second comparing means.

4. An apparatus as recited in claim 1, wherein said control means includes means for selectively disconnecting all input lines from all output lines and means for selectively restoring the connections between the input lines and the output lines.

5. A method for switching video signals from input lines to output lines, comprising the steps of:
   selectively setting a blackout start time:
   selectively setting a blackout stop time;
   comparing the blackout start time with actual time;
   disconnecting the input lines from the output lines when the actual time equals the blackout start time;

comparing the blackout stop time with actual time; and reconnecting the input lines to the output lines when the actual time equals the blackout stop time.

6. A method as recited in claim 5, further comprising the steps of determining which input lines were connected to which output lines prior to disconnection, storing connection information, and recalling connection information.

7. A method as recited in claim 5, further comprising the steps of selectively disconnecting all input lines from all output lines and selectively restoring the connections between the input lines and the output lines.

* * * * *